(12) United States Patent
Krejci et al.

(10) Patent No.: US 9,771,946 B2
(45) Date of Patent: Sep. 26, 2017

(54) TURBOCHARGER COMPRESSOR OIL DEFLECTOR AND METHOD

(71) Applicant: Caterpillar Inc., Peoria, IL (US)

(72) Inventors: Adam Krejci, Peoria, IL (US); David Martin, Dunlap, IL (US); Luis Lugo Aviles, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 497 days.

(21) Appl. No.: 14/449,281

(22) Filed: Aug. 1, 2014

(65) Prior Publication Data

US 2016/0032936 A1  Feb. 4, 2016

(51) Int. Cl.
| | |
|---|---|
| F01D 25/18 | (2006.01) |
| F04D 29/063 | (2006.01) |
| F04D 29/056 | (2006.01) |
| F04D 29/051 | (2006.01) |
| F04D 29/10 | (2006.01) |
| F02C 6/12 | (2006.01) |
| F16J 15/00 | (2006.01) |

(52) U.S. Cl.
CPC ......... *F04D 29/063* (2013.01); *F01D 25/183* (2013.01); *F01D 25/186* (2013.01); *F02C 6/12* (2013.01); *F04D 29/051* (2013.01); *F04D 29/056* (2013.01); *F04D 29/0513* (2013.01); *F04D 29/10* (2013.01); *F04D 29/102* (2013.01); *F16J 15/002* (2013.01); *F05D 2230/60* (2013.01); *F05D 2230/70* (2013.01); *F05D 2230/80* (2013.01); *F05D 2240/55* (2013.01); *F05D 2240/70* (2013.01); *F05D 2260/98* (2013.01)

(58) Field of Classification Search
CPC .... F01D 25/186; F04D 29/051; F04D 29/056; F04D 29/10; F05D 2240/70
See application file for complete search history.

(56) References Cited

U.S. PATENT DOCUMENTS

| | | | |
|---|---|---|---|
| 4,095,857 A | | 6/1978 | Palmer |
| 4,480,440 A | | 11/1984 | Harper et al. |
| 4,523,763 A | | 6/1985 | Asano et al. |
| 4,664,605 A | * | 5/1987 | Asano .................. F01D 25/183 184/6.11 |
| 7,837,448 B2 | | 11/2010 | Shimizu et al. |

(Continued)

FOREIGN PATENT DOCUMENTS

| | | |
|---|---|---|
| CN | 200955435 | 10/2007 |
| GB | 2463543 | 3/2010 |

(Continued)

*Primary Examiner* — Kenneth Bomberg
*Assistant Examiner* — Behnoush Haghighian

(57) ABSTRACT

A turbocharger includes a two-piece thrust collar that includes inner and outer portions disposed around a rotatable shaft. The inner portion is engaged with a bushing disposed in and connected to the center housing by a retainer. The outer portion is disposed adjacent the inner portion along the rotatable shaft and connected to the rotatable shaft such that it rotates therewith. The outer portion forms an annular channel that extends in a radial direction relative to the rotatable shaft and peripherally around the shaft. An oil deflector is connected to the compressor back-plate and includes a base flange and a raised portion disposed at least partially over the annular channel.

20 Claims, 4 Drawing Sheets

(56) References Cited

U.S. PATENT DOCUMENTS

| | | |
|---|---|---|
| 8,348,595 B2 | 1/2013 | Koch et al. |
| 2007/0092387 A1 | 4/2007 | Ward |
| 2013/0051973 A1 | 2/2013 | Figura et al. |
| 2014/0140865 A1 | 5/2014 | Uneura et al. |
| 2015/0337850 A1* | 11/2015 | An .................... F02B 39/00 60/605.3 |

FOREIGN PATENT DOCUMENTS

| | | |
|---|---|---|
| JP | H07217441 | 8/1995 |
| WO | WO 2013/106303 A1 | 7/2013 |

* cited by examiner

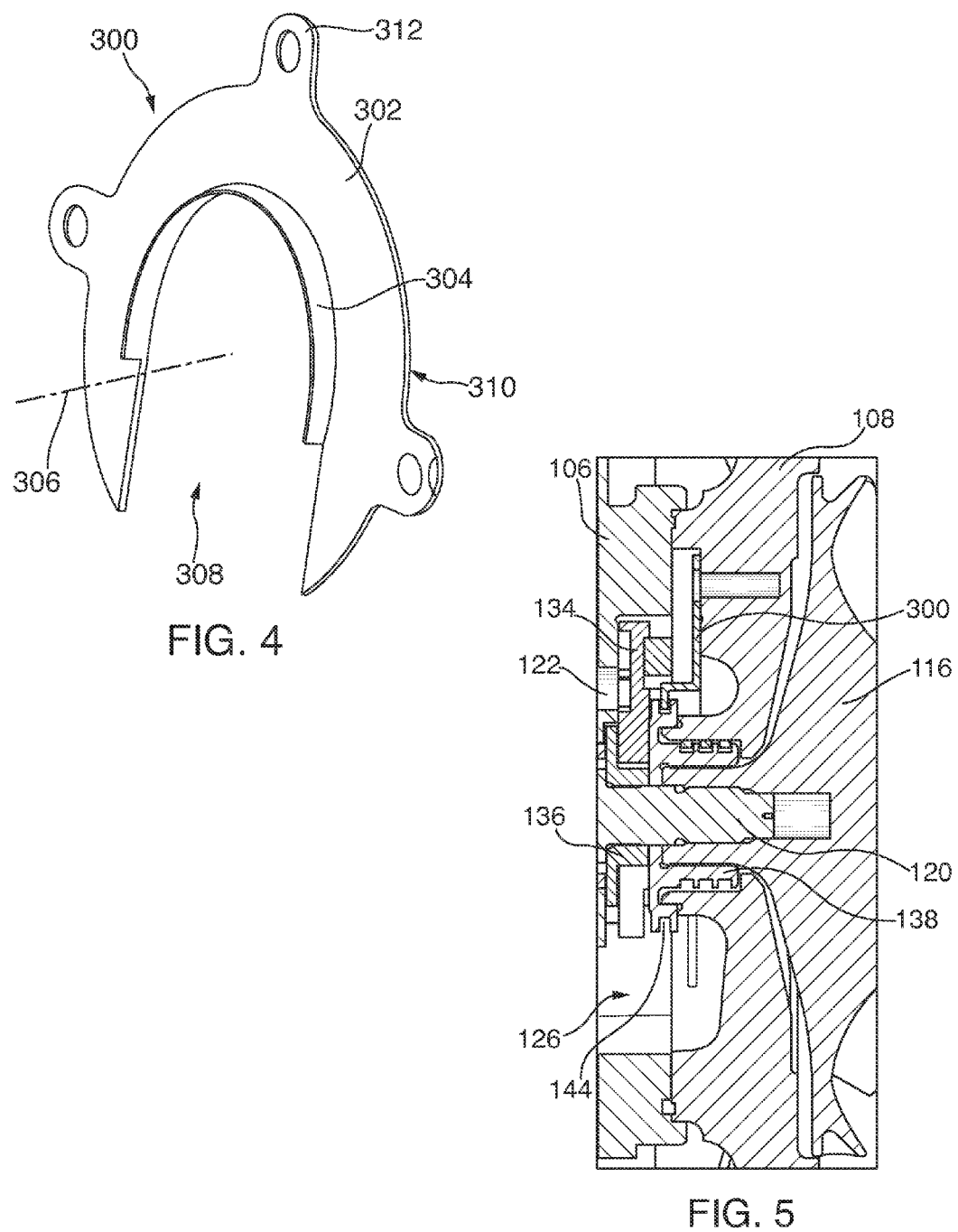

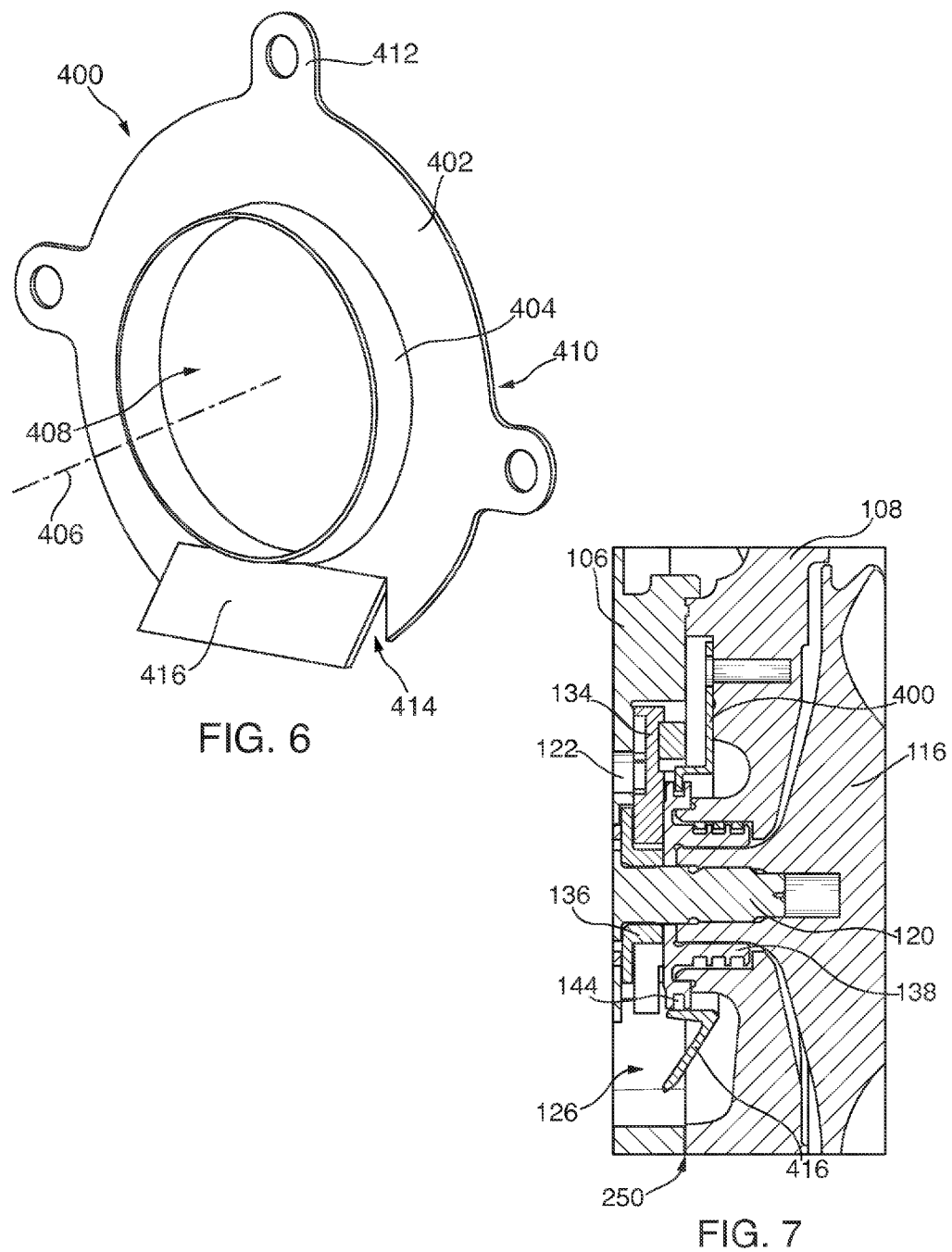

TURBOCHARGER COMPRESSOR OIL DEFLECTOR AND METHOD

TECHNICAL FIELD

This patent disclosure relates generally to air compressors and, more particularly, to air compressors in turbochargers for internal combustion engines.

BACKGROUND

In conventional air compressors such as those used on internal combustion engines, exhaust gas energy is used to compress engine intake air. In certain other applications, so called superchargers are driven directly with mechanical engine power or an electric motor to compress air that is then provided pressurized to engine cylinders. In other applications, so called turbochargers are used, which include a turbine that receives pressurized exhaust gas from the engine. The exhaust gas passes through a scrolled passage of the turbine and impinges onto a turbine wheel causing it to turn. The turbine wheel is connected to a shaft, which is connected to a compressor wheel disposed in a compressor housing. The powered rotation of the turbine wheel and shaft operate to turn the compressor wheel, which draws air into a compressor housing having a scrolled shape and compresses it.

Various types, sizes and numbers of turbochargers and/or superchargers have been used on engines in the past. One design consideration when selecting an appropriate compressor for an engine application is the air flow rate and desired pressure ratio of engine intake air. Further, because air compression increases the temperature of the compressed air, engines typically use heat exchangers, such as air-to-air heat exchangers, to cool the compressed air before it is delivered to the engine.

In certain turbocharger applications, the compressor and turbine wheels are interconnected by a shaft such that they rotate in unison. A center housing disposed between the turbine and compressor machines rotatably supports the shaft using bearings. These bearings, which may be of any known type, may use engine oil for operation, lubrication, cooling and the like. Oil is provided to the center housing, typically from the engine, and flows through the center housing while the engine operates. The oil flowing through the center housing washes over bearings supporting the shaft. In certain engine operating conditions, oil present within the center housing may leak into an operating chamber of the turbine and/or compressor housings of the turbocharger. Such oil leakage may contaminate exhaust after treatment components and/or various engine components.

SUMMARY

In one aspect, the disclosure describes a turbocharger. The turbocharger comprises a turbine and a center housing connected to the turbine. The center housing forms at least one oil passage and an oil collection gallery. A compressor back-plate is connected to the center housing, and a rotatable shaft extends through the center housing and the compressor back-plate. At least one bushing is disposed within the center housing and is configured to rotatably support the rotatable shaft. The bushing is in fluid communication with the at least one oil passage and the collection gallery such that, during operation, oil flowing through the at least one passage flows over and through the at least one bushing and collects in the oil gallery. A thrust collar is disposed around the rotatable shaft. The thrust collar is engaged with the at least one bushing and connected to the center housing by a retainer. The thrust collar is connected to the rotatable shaft such that the thrust collar rotates with the rotatable shaft when the rotatable shaft rotates. The thrust collar accommodates at least one radial seal that sealably and rotatably engages a shaft bore formed in the compressor back-plate through which the rotatable shaft extends. The thrust collar further forms an annular channel that extends in a radial direction relative to the rotatable shaft. The annular channel extends peripherally around the shaft and is disposed adjacent the back-plate. In one embodiment, an oil deflector is connected to the compressor back-plate. The oil deflector includes a base flange having a generally annular shape that at least partially surrounds a central opening and extends in a radial direction with respect to a centerline of the oil deflector, and a raised portion having a cylindrical shape. The raised portion is connected to the base flange around the central opening and extends in an axial direction relative to the centerline. When the turbocharger is in an assembled condition, a free end of the raised portion is disposed at least partially over the annular channel.

In another aspect, the disclosure describes a method for assembling a turbocharger. The method includes providing a turbine, and connecting a center housing to the turbine, where the center housing forms at least one oil passage and an oil collection gallery. The method further includes pre-assembling at least one bushing within the center housing, the at least one bushing being configured to rotatably support a rotatable shaft, the bushing being in fluid communication with the at least one oil passage and the collection gallery such that, during operation, oil flowing through the at least one passage flows over and through the at least one bushing and collects in the oil gallery. A is provided that forms an annular channel extending in a radial direction relative to the rotatable shaft. The annular channel extends peripherally around the shaft. The method includes engaging the thrust collar with the at least one bushing and connecting the thrust collar to the center housing by a retainer. The method further includes engaging the thrust collar along the rotatable shaft such that the thrust collar rotates with the rotatable shaft when the rotatable shaft rotates. The thrust collar accommodates at least one radial seal that sealably and rotatably engages a shaft bore formed in the compressor back-plate through which the rotatable shaft extends. An oil deflector is connected to a compressor back-plate. The oil deflector includes a base flange having a generally annular shape that at least partially surrounds a central opening and extends in a radial direction with respect to a centerline of the oil deflector, and a raised portion having a cylindrical shape. The raised portion is connected to the base flange around the central opening and extends in an axial direction relative to the centerline. The method further includes connecting the compressor back-plate connected to the center housing such that the rotatable shaft extends through the center housing and the compressor back-plate, wherein, when the turbocharger is in an assembled condition, a free end of the raised portion is disposed at least partially over the annular channel.

In yet another aspect, the disclosure describes a method for retrofitting a turbocharger. The method includes disassembling a compressor having a compressor back-plate from a center housing, and removing a thrust collar disposed around a rotatable shaft of the turbocharger. The method further includes providing a replacement thrust collar forming an annular channel that extends in a radial direction relative to the rotatable shaft. The annular channel extends peripherally around the shaft. The method further includes engaging the replacement thrust collar with the at least one bushing and connecting the replacement thrust collar to the center housing by a retainer. The method further includes engaging the replacement thrust collar around the rotatable shaft such that the replacement thrust collar is connected to the rotatable shaft and rotates with the rotatable shaft when the rotatable shaft rotates. The replacement thrust collar accommodates at least one radial seal that sealably and rotatably engages a shaft bore formed in the compressor back-plate through which the rotatable shaft extends. An oil deflector is connected to a compressor back-plate. The oil deflector includes a base flange having a generally annular shape that at least partially surrounds a central opening and extends in a radial direction with respect to a centerline of the oil deflector, and a raised portion having a cylindrical shape, the raised portion being connected to the base flange around the central opening and extending in an axial direction relative to the centerline. The method also includes connecting the compressor back-plate to the center housing such that the rotatable shaft extends through the center housing and the compressor back-plate. When the turbocharger is in an assembled condition, a free end of the raised portion is disposed at least partially over the annular channel.

BRIEF DESCRIPTION OF THE DRAWINGS

FIGS. 4 and 5 are partial, fragmented views of a second embodiment for an oil deflector in accordance with the disclosure.

FIGS. 6 and 7 are partial, fragmented views of a third embodiment for an oil deflector in accordance with the disclosure.

DETAILED DESCRIPTION

This disclosure relates to air compressors and, specifically, to structures and methods for deflecting oil away from an operating chamber of a compressor. In one disclosed embodiment, the compressor is a mechanically or turbine driven air compressor in an internal combustion engine. The disclosed compressor embodiments have a typical construction that includes a compressor wheel having generally radially extending vanes that operate within a scroll-shaped operating chamber formed within a compressor housing. The compressor wheel is connected to a shaft, which rotates under power provided by a turbine or other mechanical or electrical means. The compressor wheel rotates within a housing having a scrolled passage extending therethrough such that air entering the compressor housing via a central passage is radially directed into the scrolled housing, which increases the speed, pressure and temperature of the air. The shaft extends through a center housing in which oil is provided for operation, lubrication, cooling and/or for other reasons. In the disclosed embodiments, an oil deflector is used in an area between a back-plate connecting the compressor housing to the center housing, and the center housing, to discourage and avoid oil leakage from the center housing into the operating chamber of the compressor. The embodiments disclosed herein relate to compressors that are arranged with a turbine on an internal combustion engine, but should not be considered as limited to the structure or application of the compressor structures and methods described herein.

Figure 1:
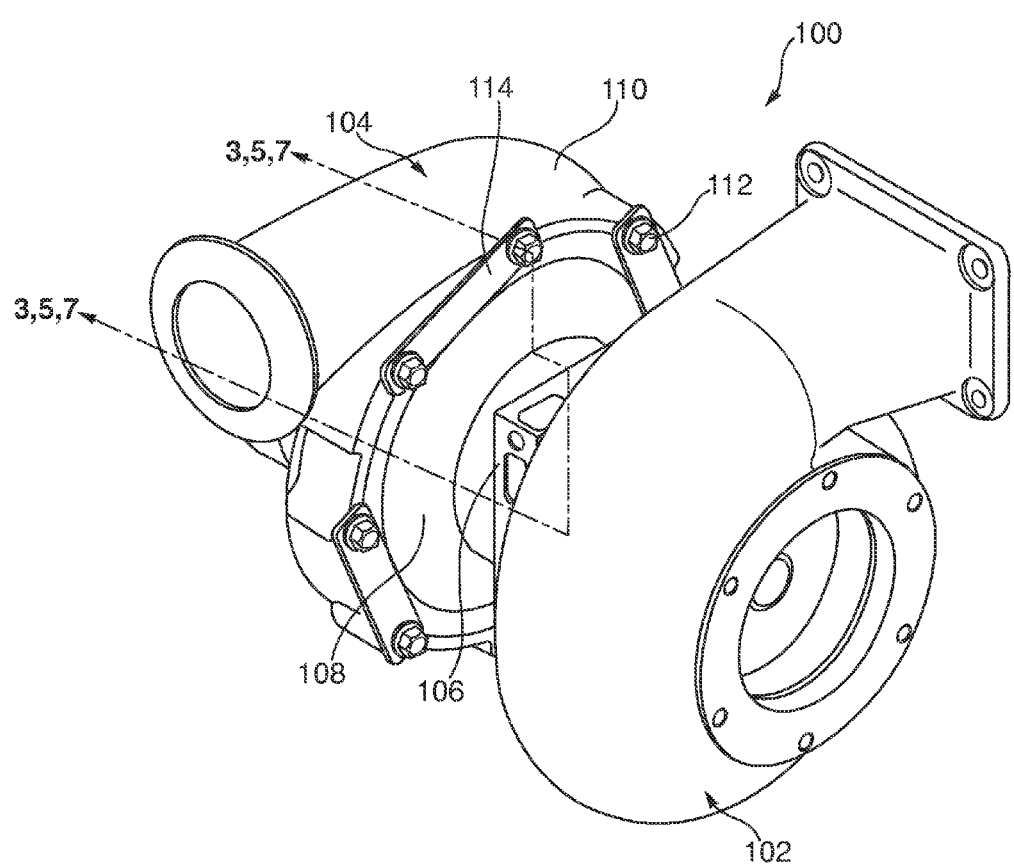
FIG. 1 is an outline view of a turbocharger in accordance with the disclosure.

An outline view of a turbocharger 100 is shown in FIG. 1. The turbocharger 100 includes a turbine 102 and a compressor 104. The turbine 102 and compressor 104 are both connected to a center housing 106. In the illustrated embodiment, the compressor 104 includes a compressor housing 110 connected to the center housing 106 via a back-plate 108. The back-plate 108, which is generally disc-shaped, can be connected to the compressor housing 110 using any known arrangement. In the illustrated embodiment, the connection arrangement between the back-plate 108 and the compressor housing 110 includes bolts 112 cooperating with plates 114 to retain the back-plate 108 within a rim surrounding a bore formed in the compressor housing 110. The compressor further includes a compressor wheel 116 housed within the compressor housing 110 in the known fashion. The compressor wheel 116 is not visible in FIG. 1 but is partially illustrated in the fragmentary views of FIGS. 3, 5 and 7.

Figure 2:
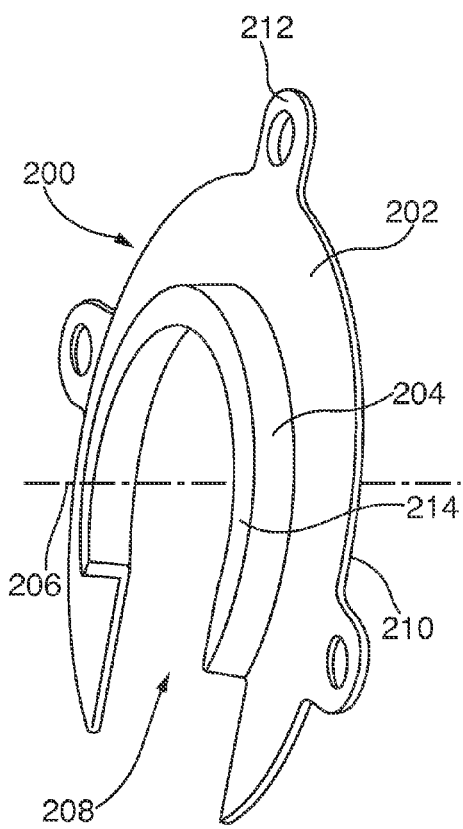
FIGS. 2 and 3 are partial, fragmented views of a first embodiment for an oil deflector in accordance with the disclosure.

FIG. 2 is an outline view of a first embodiment for an oil deflector 200 in accordance with the disclosure. The oil deflector 200 is generally annularly-shaped and includes a base flange 202 that extends in a radial direction relative to a centerline 206. The base flange 202 is connected to a central, raised portion 204 that extends in an axial direction with respect to the centerline 206. The base flange 202 and raised portion 204 extend at least partially around an opening 208. The base flange 202 is generally flat and defines an outer periphery 210 having a generally circular shape. A plurality of mounting bosses 212 (three shown) are formed on the outer periphery 210. The raised portion 204 has a hollow cylindrical shape and is concentrically disposed with the base flange 202 relative to the centerline 206.

The oil deflector 200 further includes a radial wall 214, which extends radially inward with respect to the centerline 206 and is connected to an axial end of the raised portion 204 that is opposite the base flange 202. Like the base flange 202 and the raised portion 204, the radial wall 214 extends at least partially around the opening 208 to the same extent as the remaining portions of the oil deflector 200.

Figure 3:
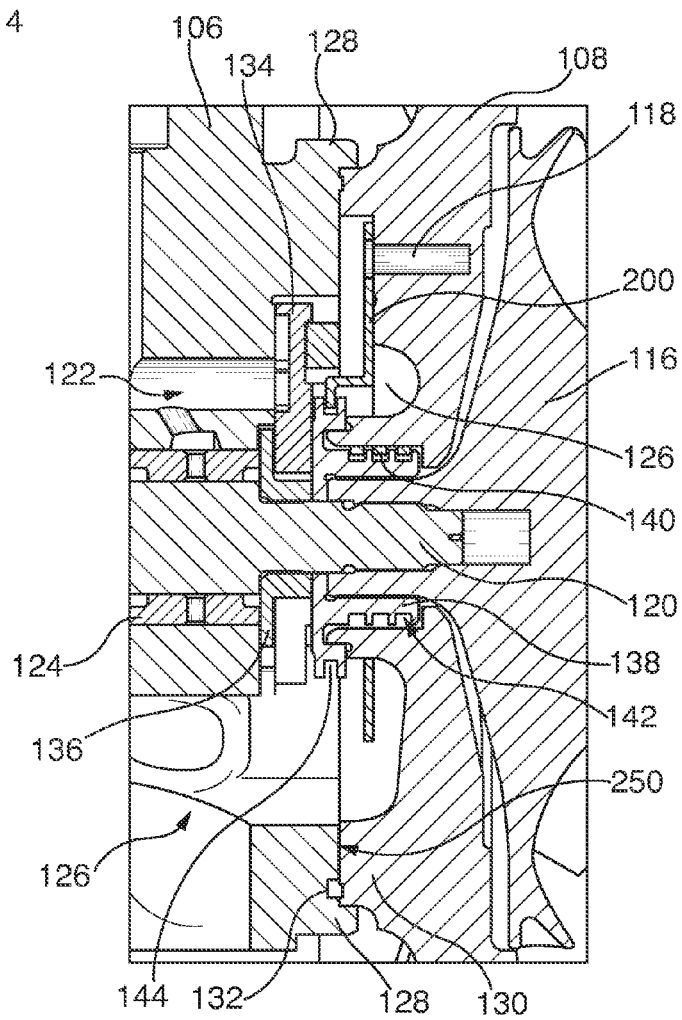

The oil deflector 200 may be formed by any appropriate materials and manufacturing methods. In the illustrated embodiment, the oil deflector 200 is formed by a cold-shaped sheet of metal, but other pliable and heat resistant materials can be used. A fragmentary view of the oil deflector 200 installed within a turbocharger, for example, the turbocharger 100 (FIG. 1), is shown in FIG. 3. As shown, the oil deflector 200 is affixed to the back-plate 108, for example, using bolts (not shown) that engage respective threaded openings 118 (one shown) formed in the back-plate 108. The threaded opening 118 may be aligned with the opening in the mounting bosses 212 when the oil deflector 200 is installed.

In the fragmentary view of FIG. 3, various internal components and features of the turbocharger can be seen. As shown, the compressor wheel 116 is connected at the end of a shaft 120, which extends through the center housing 106 and includes a turbine wheel (not shown) on its opposite end, as previously described. The shaft 120 rotates during operation of the compressor. The center housing 106 includes oil passages 122 that provide oil to bearings or bushings 124 arranged to rotatably support the shaft 120 within a bore of the center housing 106. Oil from the passages 122 washes over the bushings 124 and collects in a gallery 126 formed within the center housing 106, from where it is evacuated back to the engine in a typical fashion, for example, by gravity.

Various configurations can be used to mount the back-plate 108 to the center housing 106. In the illustrated embodiments, the center housing 106 forms an annular ledge 128 that accepts and engages a cylindrical wall 130 of the back-plate 108. A seal 132 is disposed along the interface to prevent oil from the gallery 126 from leaking through an interface 250 between the center housing 106 and the back-plate 108.

To prevent oil from leaking from the passages 122 and gallery 126, the turbocharger includes a thrust collar retainer 134, which also acts as a cap that blocks off an open end of the passages 122. The retainer 134 mechanically constrains an inner portion of a thrust collar 136 to remain in contact with the center housing 106. The thrust collar 136 is configured to retain the bushings 124 in place and to resist axial loading of the bushings, which may result from thrust loading transferred from the compressor and/or turbine wheels onto the shaft during operation. The inner portion of the thrust collar 136 mates with an outer portion of the thrust collar 138, which is fixedly disposed onto the shaft 120 and arranged to rotate therewith. In an alternative embodiment, a single-piece thrust collar may be used, for example, where the inner and outer portions 136 and 138 together form a unitary structure. A plurality of radial seals 140 are associated with the outer portion of the thrust collar 138. The seals 140 sealably and rotatably engage a shaft bore 142 of the back-plate 108 through which the shaft 120 extends. The outer portion of the thrust collar 138 forms an annular channel 144 that extends in a radial direction relative to the shaft 120 and extends peripherally around the shaft 120. In the embodiment shown in FIG. 3, the annular channel has a generally U-shaped cross section and extends around the entire periphery of the outer portion of the thrust collar 138. An open side of the annular channel faces in a radially outward direction such that the radial wall 214 of the oil deflector 200 is arranged to be disposed within, and have a clearance fit with, the annular channel 144 of the outer portion of the thrust collar 138. In this embodiment, where the radial wall 214 is disposed within the channel 144, a two-piece thrust collar as shown can be used to facilitate assembly of the compressor and center housing.

During operation of the turbocharger, a potential leak path for oil exists between the passages 122, an interface between the bearing retainer 134, the center housing 106 and the inner portion of the thrust collar 136, and the interface between the outer portion of the thrust collar 138 and the bore 142 of the back-plate 108. In other words, a possible path for oil leakage exists between the center housing 106 and the working volume of the compressor in which the compressor wheel 116 operates. Installation and use of the oil deflector 200 advantageously inhibits oil ingress into the compressor along this leak path by deflecting any potential oil leak flow away from the compressor interior volume.

In the illustrated embodiment, the oil deflector 200, in cooperation with the outer portion of the thrust collar 138, creates a tortuous path for a leakage flow of oil to enter the compressor. More specifically, oil leaking from the center housing in a direction towards the compressor will pass through the interface between the retainer 134 and the inner portion of the thrust collar 136 to reach the inner-most portion of the outer portion of the thrust collar 138. At the bottom of the assembly, oil can flow downward into the gallery 126 and away from the shaft 120. Oil at the top of the assembly may adhere, for example, through capillary action and/or a centrifugal force created by rotating motion, to the outer portion of the thrust collar 138 and flow upwards towards the channel 144. When reaching the channel, oil may fling off the outer perimeter of the outer portion of the thrust collar 138 and away from the compressor. The radial wall 214 of the oil deflector 200, as well as the raised portion 204 and base flange 202, deflect the oil flung in this fashion away from the central portion of the back-plate 108 and, thus, away from any possible ingress points into the compressor through the interface around the shaft 120. Oil that may reach and/or collect on the inner face of the deflector 200 can flow downward by gravity and collect into the gallery 126 for removal without reaching the area above the shaft 120 and behind the deflector 200, from where it may possibly enter the working volume of the compressor.

The particular design for a deflector 200 and two-piece construction of the thrust collar that includes the inner and outer portions 136 and 138 shown in FIG. 3 is advantageously well suited for turbocharger assembly. In an exemplary assembly sequence, the retainer 134 and inner portion of the thrust collar 136 may advantageously be pre-assembled onto the center housing 106. Similarly, the outer portion of the thrust collar 138 and oil deflector 200 may be pre-assembled onto and into the back-plate 108 of the compressor. In the case where a thrust collar is formed as a unitary structure that includes the inner and outer portions 136 and 138, the unitary structure can be connected during assembly to the center housing and secured with the retainer 134. With these components pre-assembled, the assembly may be completed by connecting the compressor back-plate 108 to the center housing 106 such that the inner and outer portions of the thrust collar 136 and 138 may mate, when the thrust collar is in two pieces as previously described, to form a unitary thrust collar structure, which operates in the known fashion.

An alternative embodiment for a deflector 300 is shown in FIG. 4. A fragmentary view of the deflector 300 installed into a compressor is shown in FIG. 5. Compressor features and structures that are the same or at least similar to corresponding features and structures previously described are denoted herein for simplicity using the same reference numerals as previously used. The deflector 300 is similar in many respects to the oil deflector 200 (FIG. 2) in that it includes a generally flat, annularly shaped base flange 302 that extends in a radial direction relative to a centerline 306. The base flange 302 is connected to a central, raised portion 304 that extends in an axial direction with respect to the centerline 306. The base flange 302 and raised portion 304 extend at least partially around an opening 308. The base flange 302 is generally flat and defines an outer periphery 310 having a generally circular shape. A plurality of mounting bosses 312 (three shown) are formed on the outer periphery 310. The raised portion 304 has a hollow cylindrical shape and is concentrically disposed with the base flange 302 relative to the centerline 306.

One structural difference between the oil deflector 300 and the oil deflector 200 (FIG. 2) is the absence of the radial wall 214 (FIG. 2). In this embodiment, a single-piece thrust collar may be used. A fragmentary view of the oil deflector 300 installed within a turbocharger, for example, the turbocharger 100 (FIG. 1), is shown in FIG. 5. As shown, the oil deflector 300 is affixed to the back-plate 108, for example, using the mounting bosses 312. In the illustrated embodiment, the oil deflector 300, in cooperation with the outer portion of the thrust collar 138, shields against oil entering the working volume of the compressor. During operation, when a leakage flow of oil reaches the channel 144 of the outer portion of the thrust collar 138, the oil is flung off the outer perimeter. The raised portion 304 and base flange 302 of the oil deflector 300 deflect the flinging oil away from the central portion of the back-plate 108 and, thus, away from any possible ingress points into the compressor through the interface around the shaft 120. Oil that may reach and/or collect on the inner face of the deflector 300 can flow downward and either collect into the gallery 126 or within the channel 144 for removal without reaching the area above the shaft 120 and behind the deflector 200, from where it may possibly enter the working volume of the compressor.

Another alternative embodiment for a deflector 400 is shown in FIG. 6. A fragmentary view of the deflector 400 installed into a compressor is shown in FIG. 7. Compressor features and structures that are the same or similar to corresponding features and structures previously described are denoted herein for simplicity using the same reference numerals as previously used. The deflector 400 is similar in many respects to the oil deflectors 200 (FIG. 2) and 300 (FIG. 4) in that it includes a generally flat, annularly shaped base flange 402 that extends in a radial direction relative to a centerline 406. The base flange 402 is connected to a central, raised portion 404 that extends in an axial direction with respect to the centerline 406. The base flange 402 and raised portion 404 extend entirely around a central opening 408 formed in the base flange 402. In this embodiment, the raised portion 404 also surrounds the central opening 408. The base flange 402 is generally flat and defines an outer periphery 410 having a generally circular shape. A plurality of mounting bosses 412 (three shown) are formed on the outer periphery 410. The raised portion 404 has a hollow cylindrical shape and is concentrically disposed with the base flange 402 relative to the centerline 406.

One structural difference between the oil deflector 400 and oil deflector 200 (FIG. 2) is the absence of the radial wall 214 (FIG. 2). In this embodiment as well, a single-piece thrust collar may be used. Moreover, as mentioned above, the base flange 402 extends entirely around the central opening 408. A cutout 414 is formed in the bottom portion of the base flange 402 such that a redirecting panel 416 is formed. The panel 416 is connected to the base flange 402 along a base of the cutout 414 and is bent away from the base flange 402 in the same direction along the centerline 406 as the raised portion 404.

A fragmentary view of the oil deflector 400 installed within a turbocharger, for example, the turbocharger 100 (FIG. 1), is shown in FIG. 7. As shown, the oil deflector 400 is affixed to the back-plate 108, for example, using the mounting bosses 412. In the illustrated embodiment, the oil deflector 400, in cooperation with the outer portion of the thrust collar 138, shields against oil entering the working volume of the compressor. During operation, when a leakage flow of oil reaches the channel 144 of the outer portion of the thrust collar 138, the oil is flung off the outer perimeter. The raised portion 404 and base flange 402 of the oil deflector 400 deflect the flinging oil away from the central portion of the back-plate 108 and, thus, away from any possible ingress points into the compressor through the interface around the shaft 120. Oil that may reach and/or collect on the inner face of the deflector 400 can flow downward and collect into the gallery 126 for removal without reaching the area above the shaft 120 and behind the deflector 200, from where it may possibly enter the working volume of the compressor. As is shown in the bottom portion of FIG. 7, oil that may be dripping off the deflector 400 may be redirected by the panel 416 away from the interface 250 between the back-plate 108 and center housing 106, and towards a central portion of the gallery 126.

INDUSTRIAL APPLICABILITY

The embodiments for oil deflectors and a two-piece construction for a turbocharger compressor thrust collar are applicable not only to compressors used with internal combustion engines, but to any radial vane compressors using oil to lubricate and cool bushings rotatably supporting the compressor wheel. In the disclosed embodiments, connection of the respective oil deflectors to the back-plate of the compressor, along with the two-piece construction of the thrust collar for certain embodiments, permit the sub-assembly of the various components to the compressor and center housing such that final assembly of the turbocharger remains unaffected. The various embodiments for an oil deflector disclosed herein, along with the replacement thrust collar having the annular channel, may advantageously be used to retrofit or remanufacture existing turbochargers having a single-piece thrust collar and no oil deflector, which turbochargers may be susceptible to oil leakage into the compressor from the center housing. In retrofitting existing turbochargers, or for newly manufactured units, the sub-assembly of the oil deflector and replacement thrust collar may advantageously allow the assembly sequence of the original turbocharger to remain unchanged.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A turbocharger, comprising:
   a turbine;
   a center housing connected to the turbine, the center housing forming at least one oil passage and an oil collection gallery therein;
   a compressor back-plate connected to the center housing;
   a rotatable shaft extending through the center housing and the compressor back-plate;
   at least one bushing disposed within the center housing and configured to rotatably support the rotatable shaft, the bushing being in fluid communication with the at least one oil passage and the collection gallery such that, during operation, oil flowing through the at least one passage flows over and through the at least one bushing and collects in the oil collection gallery;
   a thrust collar disposed around the rotatable shaft, the thrust collar engaged with the at least one bushing and connected to the center housing by a retainer, the thrust collar configured to rotate with the rotatable shaft when the rotatable shaft rotates, the thrust collar accommodating at least one radial seal that sealably and rotatably engages a shaft bore formed in the compressor back-plate through which the rotatable shaft extends, the thrust collar further forming an annular channel adjacent the back-plate that extends in a radial direction relative to the rotatable shaft, the annular channel extending peripherally around the rotatable shaft;

an oil deflector connected to the compressor back-plate, the oil deflector including:
- a base flange having a generally annular shape that at least partially surrounds a central opening and extends in a radial direction with respect to a centerline of the oil deflector;
- a raised portion having a cylindrical shape, the raised portion being connected to the base flange around the central opening and extending from the base flange in an axial direction relative to the centerline away from the compressor back-plate;
- wherein, when the turbocharger is in an assembled condition, a free end of the raised portion is disposed at least partially over the annular channel.

2. The turbocharger of claim 1, wherein the thrust collar is a two-piece thrust collar including an inner portion and an outer portion, the inner portion engaged with the at least one bushing and connected to the center housing by the retainer, and the outer portion disposed adjacent the inner portion along the rotatable shaft, the outer portion accommodating the at least one radial seal and further forming the annular channel.

3. The turbocharger of claim 2, wherein the oil deflector further includes a radial wall extending radially inward with respect to the centerline and connected to the free end of the raised portion that is opposite the base flange, and wherein the radial wall is at least partially disposed within, and has a clearance fit with, the annular channel such that a tortuous path is created for oil leaking from the at least one passage through the compressor back-plate.

4. The turbocharger of claim 1, wherein the annular channel has a generally U-shaped cross section and extends around an entire outer periphery of the outer portion.

5. The turbocharger of claim 4, wherein an open side of the annular channel faces in a radially outward direction.

6. The turbocharger of claim 1, wherein the oil deflector further includes at least one mounting boss disposed along an outer periphery of the base flange, wherein the oil deflector is connected to the compressor back-plate using at least one bolt extending through the at least one mounting boss and threadably engaging a threaded opening formed in the compressor back-plate.

7. The turbocharger of claim 1, wherein the base flange and the raised portion extend entirely around the central opening, the base flange further comprising:
- a cutout formed in the bottom portion of the base flange, and
- a redirecting panel connected to the base flange along a base of the cutout and extending at an angle away from the base flange in the same direction along the centerline as the raised portion.

8. A method for assembling a turbocharger, comprising:
providing a turbine;
connecting a center housing to the turbine, the center housing forming at least one oil passage and an oil collection gallery therein;
pre-assembling at least one bushing within the center housing, the at least one bushing being configured to rotatably support a rotatable shaft, the bushing being in fluid communication with the at least one oil passage and the collection gallery such that, during operation, oil flowing through the at least one passage flows over and through the at least one bushing and collects in the oil collection gallery;
providing a thrust collar forming an annular channel that extends in a radial direction relative to the rotatable shaft, the annular channel extending peripherally around the rotatable shaft;
engaging the thrust collar with the at least one bushing and connecting the thrust collar to the center housing by a retainer,
connecting an oil deflector connected to the compressor back-plate, the oil deflector including:
- a base flange having a generally annular shape that at least partially surrounds a central opening and extends in a radial direction with respect to a centerline of the oil deflector;
- a raised portion having a cylindrical shape, the raised portion being connected to the base flange around the central opening and extending from the base flange in an axial direction relative to the centerline away from the compressor back-plate;

connecting the compressor back-plate connected to the center housing such that the rotatable shaft extends through the center housing and the compressor back-plate;
wherein, when the turbocharger is in an assembled condition, a free end of the raised portion is disposed at least partially over the annular channel.

9. The method of claim 8, wherein the thrust collar is a two-piece thrust collar including an inner portion and an outer portion, the method further comprising:
engaging the inner portion of the thrust collar with the at least one bushing and connecting the inner portion of the thrust collar to the center housing by the retainer; and
engaging the outer portion around the rotatable shaft such that the outer portion is disposed adjacent the inner portion along the rotatable shaft and connected to the rotatable shaft such that the outer portion rotates with the rotatable shaft when the rotatable shaft rotates, the outer portion accommodating at least one radial seal that sealably and rotatably engages a shaft bore formed in a compressor back-plate through which the rotatable shaft extends.

10. The method of claim 9, wherein the oil deflector further includes a radial wall extending radially inward with respect to the centerline and connected to the free end of the raised portion that is opposite the base flange, and wherein the radial wall is at least partially disposed within, and has a clearance fit with, the annular channel such that a tortuous path is created for oil leaking from the at least one passage through the compressor back-plate.

11. The method of claim 8, wherein the annular channel has a generally U-shaped cross section and extends around an entire outer periphery of the outer portion, and wherein an open side of the annular channel faces in a radially outward direction.

12. The method of claim 8, wherein the oil deflector further includes at least one mounting boss disposed along an outer periphery of the base flange, wherein connecting oil deflector to the compressor back-plate includes using at least one bolt extending through the at least one mounting boss and threadably engaging a threaded opening formed in the compressor back-plate.

13. The method of claim 8, further comprising inserting a seal between the center housing and the compressor back-plate.

14. The method of claim 8, wherein the base flange and the raised portion extend entirely around the central opening, the base flange further comprising:
- a cutout formed in the bottom portion of the base flange, and
- a redirecting panel connected to the base flange along a base of the cutout and extending at an angle away from the base flange in the same direction along the centerline as the raised portion.

15. A method for retrofitting a turbocharger, comprising:
- disassembling a compressor having a compressor back-plate from a center housing, and removing a thrust collar disposed around a rotatable shaft of the turbocharger;
- providing a replacement thrust collar, the replacement thrust collar forming an annular channel that extends in a radial direction relative to the rotatable shaft, the annular channel extending peripherally around the rotatable shaft;
- engaging the replacement thrust collar with at least one bushing and connecting the replacement thrust collar to the center housing by a retainer,
- engaging the replacement thrust collar around the rotatable shaft such that the replacement thrust collar is connected to the rotatable shaft and rotates with the rotatable shaft when the rotatable shaft rotates, replacement thrust collar accommodating at least one radial seal that sealably and rotatably engages a shaft bore formed in the compressor back-plate through which the rotatable shaft extends;
- connecting an oil deflector connected to the compressor back-plate, the oil deflector including:
  - a base flange having a generally annular shape that at least partially surrounds a central opening and extends in a radial direction with respect to a centerline of the oil deflector;
  - a raised portion having a cylindrical shape, the raised portion being connected to the base flange around the central opening and extending from the base flange in an axial direction relative to the centerline away from the compressor back-plate;
- connecting the compressor back-plate connected to the center housing such that the rotatable shaft extends through the center housing and the compressor back-plate;
- wherein, when the turbocharger is in an assembled condition, a free end of the raised portion is disposed at least partially over the annular channel.

16. The method of claim 15, wherein the replacement thrust collar is a two-piece thrust collar including an inner portion and an outer portion such that the inner portion is engaged with the at least one bushing and connected to the center housing by the retainer, and the outer portion is disposed adjacent to the inner portion along the rotatable shaft.

17. The method of claim 16, wherein the oil deflector further includes a radial wall extending radially inward with respect to the centerline and connected to the free end of the raised portion that is opposite the base flange, and wherein the radial wall is at least partially disposed within, and has a clearance fit with, the annular channel such that a tortuous path is created for oil leaking from the at least one passage through the compressor back-plate.

18. The method of claim 15, wherein the annular channel has a generally U-shaped cross section and extends around an entire outer periphery of the outer portion, and wherein an open side of the annular channel faces in a radially outward direction.

19. The method of claim 15, wherein the oil deflector further includes at least one mounting boss disposed along an outer periphery of the base flange, wherein connecting oil deflector to the compressor back-plate includes using at least one bolt extending through the at least one mounting boss and threadably engaging a threaded opening formed in the compressor back-plate.

20. The method of claim 15, wherein the base flange and the raised portion extend entirely around the central opening, the base flange further comprising:
- a cutout formed in the bottom portion of the base flange, and
- a redirecting panel connected to the base flange along a base of the cutout and extending at an angle away from the base flange in the same direction along the centerline as the raised portion.

\* \* \* \* \*